(12) United States Patent
Casado et al.

(10) Patent No.: US 8,966,035 B2
(45) Date of Patent: Feb. 24, 2015

(54) METHOD AND APPARATUS FOR IMPLEMENTING AND MANAGING DISTRIBUTED VIRTUAL SWITCHES IN SEVERAL HOSTS AND PHYSICAL FORWARDING ELEMENTS

(75) Inventors: Martin Casado, Menlo Park, CA (US); Paul Ingram, Palo Alto, CA (US); Keith Eric Amidon, Los Altos, CA (US); Peter J. Balland, III, Dublin, CA (US); Teemu Koponen, San Francisco, CA (US); Benjamin Levy Pfaff, Redwood City, CA (US); Justin Pettit, San Jose, CA (US); Jesse E. Gross, IV, San Francisco, CA (US); Daniel J. Wendlandt, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 12/753,044

(22) Filed: Apr. 1, 2010

(65) Prior Publication Data

US 2010/0257263 A1    Oct. 7, 2010

Related U.S. Application Data

(60) Provisional application No. 61/165,875, filed on Apr. 1, 2009.

(51) Int. Cl.
*G06F 9/455*      (2006.01)
*G06F 15/173*    (2006.01)
*H04L 12/931*    (2013.01)

(52) U.S. Cl.
CPC ............... *H04L 49/00* (2013.01); *H04L 49/70* (2013.01)
USPC ............................................. 709/223; 718/1

(58) Field of Classification Search
CPC ................................. H04L 49/70; H04L 49/00
USPC ................................................. 709/217–228
See application file for complete search history.

(56) References Cited

U.S. PATENT DOCUMENTS 5,265,092 A    11/1993   Soloway et al.
5,504,921 A    4/1996    Dev et al.

(Continued)

FOREIGN PATENT DOCUMENTS

AU    2010232526    10/2011
AU    2008304243    12/2013

(Continued)

OTHER PUBLICATIONS

OpenFlow: Enabling Innovation in Campus Networks, Mar. 14, 2008, McKeown et al., pp. 1-6.*

(Continued)

*Primary Examiner* — Haresh N Patel
(74) *Attorney, Agent, or Firm* — Adeli LLP

(57) ABSTRACT

In general, the present invention relates to a virtual platform in which one or more distributed virtual switches can be created for use in virtual networking. According to some aspects, the distributed virtual switch according to the invention provides the ability for virtual and physical machines to more readily, securely, and efficiently communicate with each other even if they are not located on the same physical host and/or in the same subnet or VLAN. According other aspects, the distributed virtual switches of the invention can support integration with traditional IP networks and support sophisticated IP technologies including NAT functionality, stateful firewalling, and notifying the IP network of workload migration. According to further aspects, the virtual platform of the invention creates one or more distributed virtual switches which may be allocated to a tenant, application, or other entity requiring isolation and/or independent configuration state. According to still further aspects, the virtual platform of the invention manages and/or uses VLAN or tunnels (e.g, GRE) to create a distributed virtual switch for a network while working with existing switches and routers in the network. The present invention finds utility in both enterprise networks, datacenters and other facilities.

28 Claims, 3 Drawing Sheets

(56) References Cited

U.S. PATENT DOCUMENTS

| | | | |
|---|---|---|---|
| 5,550,816 | A | 8/1996 | Hardwick et al. |
| 5,729,685 | A | 3/1998 | Chatwani et al. |
| 5,751,967 | A | 5/1998 | Raab et al. |
| 5,796,936 | A | 8/1998 | Watabe et al. |
| 5,926,463 | A | 7/1999 | Ahearn et al. |
| 6,006,275 | A | 12/1999 | Picazo, Jr. et al. |
| 6,055,243 | A | 4/2000 | Vincent et al. |
| 6,104,699 | A | 8/2000 | Holender et al. |
| 6,104,700 | A | 8/2000 | Haddock et al. |
| 6,219,699 | B1 | 4/2001 | McCloghrie et al. |
| 6,512,745 | B1 | 1/2003 | Abe et al. |
| 6,539,432 | B1 | 3/2003 | Taguchi et al. |
| 6,680,934 | B1 | 1/2004 | Cain |
| 6,697,338 | B1 | 2/2004 | Breitbart et al. |
| 6,735,602 | B2 | 5/2004 | Childress et al. |
| 6,785,843 | B1 | 8/2004 | McRae et al. |
| 6,912,221 | B1 | 6/2005 | Zadikian et al. |
| 6,963,585 | B1 | 11/2005 | Le Pennec et al. |
| 6,985,937 | B1 | 1/2006 | Keshav et al. |
| 7,042,912 | B2 | 5/2006 | Ashwood Smith et al. |
| 7,046,630 | B2 | 5/2006 | Abe et al. |
| 7,080,378 | B1 | 7/2006 | Noland et al. |
| 7,126,923 | B1 | 10/2006 | Yang et al. |
| 7,158,972 | B2 | 1/2007 | Marsland |
| 7,197,561 | B1 | 3/2007 | Lovy et al. |
| 7,197,572 | B2 | 3/2007 | Matters et al. |
| 7,200,144 | B2 | 4/2007 | Terrell et al. |
| 7,209,439 | B2 | 4/2007 | Rawlins et al. |
| 7,263,290 | B2 | 8/2007 | Fortin et al. |
| 7,283,473 | B2 | 10/2007 | Arndt et al. |
| 7,286,490 | B2 | 10/2007 | Saleh et al. |
| 7,342,916 | B2 | 3/2008 | Das et al. |
| 7,343,410 | B2 | 3/2008 | Mercier et al. |
| 7,359,971 | B2 * | 4/2008 | Jorgensen .................... 709/226 |
| 7,450,598 | B2 | 11/2008 | Chen et al. |
| 7,463,579 | B2 | 12/2008 | Lapuh et al. |
| 7,478,173 | B1 | 1/2009 | Delco |
| 7,519,696 | B2 | 4/2009 | Blumenau et al. |
| 7,555,002 | B2 | 6/2009 | Arndt et al. |
| 7,587,492 | B2 | 9/2009 | Dyck et al. |
| 7,590,669 | B2 | 9/2009 | Yip et al. |
| 7,606,260 | B2 | 10/2009 | Oguchi et al. |
| 7,643,488 | B2 | 1/2010 | Khanna et al. |
| 7,649,851 | B2 | 1/2010 | Takashige et al. |
| 7,710,874 | B2 | 5/2010 | Balakrishnan et al. |
| 7,764,599 | B2 | 7/2010 | Doi et al. |
| 7,783,856 | B2 | 8/2010 | Hashimoto et al. |
| 7,792,987 | B1 | 9/2010 | Vohra et al. |
| 7,802,251 | B2 | 9/2010 | Kitamura |
| 7,808,929 | B2 | 10/2010 | Wong et al. |
| 7,818,452 | B2 | 10/2010 | Matthews et al. |
| 7,826,482 | B1 | 11/2010 | Minei et al. |
| 7,827,294 | B2 | 11/2010 | Merkow et al. |
| 7,839,847 | B2 | 11/2010 | Nadeau et al. |
| 7,856,549 | B2 | 12/2010 | Wheeler |
| 7,885,276 | B1 | 2/2011 | Lin |
| 7,912,955 | B1 | 3/2011 | Machiraju et al. |
| 7,925,661 | B2 | 4/2011 | Broussard et al. |
| 7,936,770 | B1 | 5/2011 | Frattura et al. |
| 7,937,438 | B1 | 5/2011 | Miller et al. |
| 7,945,658 | B1 | 5/2011 | Nucci et al. |
| 7,948,986 | B1 | 5/2011 | Ghosh et al. |
| 7,953,865 | B1 | 5/2011 | Miller et al. |
| 7,970,917 | B2 | 6/2011 | Nakano et al. |
| 7,991,859 | B1 | 8/2011 | Miller et al. |
| 7,995,483 | B1 | 8/2011 | Bayar et al. |
| 8,027,354 | B1 | 9/2011 | Portolani et al. |
| 8,031,633 | B2 | 10/2011 | Bueno et al. |
| 8,032,899 | B2 | 10/2011 | Archer et al. |
| 8,046,456 | B1 | 10/2011 | Miller et al. |
| 8,054,832 | B1 | 11/2011 | Shukla et al. |
| 8,055,789 | B2 | 11/2011 | Richardson et al. |
| 8,060,875 | B1 | 11/2011 | Lambeth |
| 8,089,871 | B2 | 1/2012 | Iloglu et al. |
| 8,130,648 | B2 | 3/2012 | Kwan et al. |
| 8,131,852 | B1 | 3/2012 | Miller et al. |
| 8,149,734 | B2 | 4/2012 | Lu |
| 8,149,737 | B2 | 4/2012 | Metke et al. |
| 8,155,028 | B2 | 4/2012 | Abu-Hamdeh et al. |
| 8,161,152 | B2 | 4/2012 | Ogielski et al. |
| 8,166,201 | B2 | 4/2012 | Richardson et al. |
| 8,199,750 | B1 | 6/2012 | Schultz et al. |
| 8,223,668 | B2 | 7/2012 | Allan et al. |
| 8,224,931 | B1 | 7/2012 | Brandwine et al. |
| 8,224,971 | B1 | 7/2012 | Miller et al. |
| 8,265,075 | B2 | 9/2012 | Pandey |
| 8,312,129 | B1 | 11/2012 | Miller et al. |
| 8,339,959 | B1 | 12/2012 | Moisand et al. |
| 8,339,994 | B2 | 12/2012 | Gnanasekaran et al. |
| 8,351,418 | B2 | 1/2013 | Zhao et al. |
| 8,565,597 | B2 | 10/2013 | Zheng |
| 8,611,351 | B2 | 12/2013 | Gooch et al. |
| 8,612,627 | B1 | 12/2013 | Brandwine |
| 8,625,603 | B1 | 1/2014 | Ramakrishnan et al. |
| 8,644,188 | B1 | 2/2014 | Brandwine et al. |
| 8,650,618 | B2 | 2/2014 | Asati et al. |
| 2001/0043614 | A1 | 11/2001 | Viswanadham et al. |
| 2002/0034189 | A1 | 3/2002 | Haddock et al. |
| 2002/0093952 | A1 | 7/2002 | Gonda |
| 2002/0131414 | A1 | 9/2002 | Hadzic |
| 2002/0161867 | A1 | 10/2002 | Cochran et al. |
| 2002/0194369 | A1 | 12/2002 | Rawlins et al. |
| 2003/0009552 | A1 | 1/2003 | Benfield et al. |
| 2003/0041170 | A1 | 2/2003 | Suzuki |
| 2003/0058850 | A1 | 3/2003 | Rangarajan et al. |
| 2003/0069972 | A1 | 4/2003 | Yoshimura et al. |
| 2003/0204768 | A1 | 10/2003 | Fee |
| 2004/0054680 | A1 | 3/2004 | Kelley et al. |
| 2004/0054793 | A1 | 3/2004 | Coleman |
| 2004/0073659 | A1 | 4/2004 | Rajsic et al. |
| 2004/0098505 | A1 | 5/2004 | Clemmensen |
| 2004/0151147 | A1 | 8/2004 | Huckins |
| 2004/0210889 | A1 | 10/2004 | Childress et al. |
| 2004/0267897 | A1 | 12/2004 | Hill et al. |
| 2005/0018669 | A1 | 1/2005 | Arndt et al. |
| 2005/0021683 | A1 | 1/2005 | Newton et al. |
| 2005/0027881 | A1 | 2/2005 | Figueira et al. |
| 2005/0050377 | A1 | 3/2005 | Chan et al. |
| 2005/0053079 | A1 | 3/2005 | Havala |
| 2005/0083953 | A1 | 4/2005 | May |
| 2005/0120160 | A1 | 6/2005 | Plouffe et al. |
| 2005/0132044 | A1 | 6/2005 | Guingo et al. |
| 2005/0201398 | A1 | 9/2005 | Naik et al. |
| 2005/0232230 | A1 | 10/2005 | Nagami et al. |
| 2006/0002370 | A1 | 1/2006 | Rabie et al. |
| 2006/0026225 | A1 | 2/2006 | Canali et al. |
| 2006/0028999 | A1 | 2/2006 | Iakobashvili et al. |
| 2006/0037075 | A1 | 2/2006 | Frattura et al. |
| 2006/0092976 | A1 | 5/2006 | Lakshman et al. |
| 2006/0174087 | A1 | 8/2006 | Hashimoto et al. |
| 2006/0178898 | A1 | 8/2006 | Habibi |
| 2006/0184653 | A1 | 8/2006 | van Riel |
| 2006/0184937 | A1 | 8/2006 | Abels et al. |
| 2006/0193266 | A1 | 8/2006 | Siddha et al. |
| 2006/0221961 | A1 | 10/2006 | Basso et al. |
| 2006/0248179 | A1 | 11/2006 | Short et al. |
| 2006/0282895 | A1 | 12/2006 | Rentzis et al. |
| 2007/0028239 | A1 | 2/2007 | Dyck et al. |
| 2007/0043860 | A1 | 2/2007 | Pabari |
| 2007/0174429 | A1 | 7/2007 | Mazzaferri et al. |
| 2007/0220358 | A1 | 9/2007 | Goodill et al. |
| 2007/0233838 | A1 | 10/2007 | Takamoto et al. |
| 2007/0239987 | A1 | 10/2007 | Hoole et al. |
| 2007/0240160 | A1 | 10/2007 | Paterson-Jones et al. |
| 2007/0245082 | A1 | 10/2007 | Margolus et al. |
| 2007/0250608 | A1 | 10/2007 | Watt |
| 2007/0260721 | A1 | 11/2007 | Bose et al. |
| 2007/0266433 | A1 | 11/2007 | Moore |
| 2007/0286185 | A1 | 12/2007 | Eriksson et al. |
| 2007/0297428 | A1 | 12/2007 | Bose et al. |
| 2008/0002579 | A1 | 1/2008 | Lindholm et al. |
| 2008/0002683 | A1 | 1/2008 | Droux et al. |
| 2008/0034249 | A1 | 2/2008 | Husain et al. |
| 2008/0049614 | A1 | 2/2008 | Briscoe et al. |

(56) References Cited

U.S. PATENT DOCUMENTS

| | | |
|---|---|---|
| 2008/0049621 A1 | 2/2008 | McGuire et al. |
| 2008/0049646 A1 | 2/2008 | Lu |
| 2008/0052206 A1 | 2/2008 | Edwards et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0163207 A1 | 7/2008 | Reumann et al. |
| 2008/0189769 A1 | 8/2008 | Casado et al. |
| 2008/0196100 A1 | 8/2008 | Madhavan et al. |
| 2008/0212963 A1 | 9/2008 | Fortin et al. |
| 2008/0225853 A1* | 9/2008 | Melman et al. .............. 370/392 |
| 2008/0240122 A1 | 10/2008 | Richardson et al. |
| 2008/0253366 A1 | 10/2008 | Zuk et al. |
| 2008/0279196 A1 | 11/2008 | Friskney et al. |
| 2008/0291910 A1* | 11/2008 | Tadimeti et al. ............. 370/389 |
| 2009/0031041 A1 | 1/2009 | Clemmensen |
| 2009/0043823 A1 | 2/2009 | Iftode et al. |
| 2009/0049453 A1 | 2/2009 | Baran et al. |
| 2009/0083445 A1* | 3/2009 | Ganga ........................... 709/250 |
| 2009/0089625 A1* | 4/2009 | Kannappan et al. ............ 714/39 |
| 2009/0097495 A1 | 4/2009 | Palacharla et al. |
| 2009/0122710 A1 | 5/2009 | Bar-Tor et al. |
| 2009/0138577 A1* | 5/2009 | Casado et al. ................ 709/220 |
| 2009/0150527 A1 | 6/2009 | Tripathi et al. |
| 2009/0161547 A1 | 6/2009 | Riddle et al. |
| 2009/0222924 A1 | 9/2009 | Droz et al. |
| 2009/0240924 A1* | 9/2009 | Yasaki et al. .................. 712/220 |
| 2009/0249473 A1 | 10/2009 | Cohn |
| 2009/0276661 A1 | 11/2009 | Deguchi et al. |
| 2009/0279536 A1 | 11/2009 | Unbehagen et al. |
| 2009/0279545 A1 | 11/2009 | Moonen |
| 2009/0292858 A1* | 11/2009 | Lambeth et al. .................. 711/6 |
| 2009/0303880 A1 | 12/2009 | Maltz et al. |
| 2010/0046531 A1 | 2/2010 | Louati et al. |
| 2010/0061231 A1 | 3/2010 | Harmatos et al. |
| 2010/0070970 A1 | 3/2010 | Hu et al. |
| 2010/0082799 A1 | 4/2010 | Dehaan et al. |
| 2010/0115101 A1 | 5/2010 | Lain et al. |
| 2010/0131636 A1* | 5/2010 | Suri et al. ...................... 709/224 |
| 2010/0138830 A1 | 6/2010 | Astete et al. |
| 2010/0153554 A1 | 6/2010 | Anschutz et al. |
| 2010/0153701 A1 | 6/2010 | Shenoy et al. |
| 2010/0165877 A1 | 7/2010 | Shukla et al. |
| 2010/0169467 A1 | 7/2010 | Shukla et al. |
| 2010/0191612 A1 | 7/2010 | Raleigh |
| 2010/0191846 A1 | 7/2010 | Raleigh |
| 2010/0192207 A1 | 7/2010 | Raleigh |
| 2010/0192225 A1 | 7/2010 | Ma et al. |
| 2010/0205479 A1 | 8/2010 | Akutsu et al. |
| 2010/0214949 A1* | 8/2010 | Smith et al. ................... 370/254 |
| 2010/0235832 A1* | 9/2010 | Rajagopal et al. ................ 718/1 |
| 2010/0275199 A1 | 10/2010 | Smith et al. |
| 2010/0290485 A1 | 11/2010 | Martini et al. |
| 2011/0004913 A1* | 1/2011 | Nagarajan et al. ................ 726/1 |
| 2011/0016215 A1 | 1/2011 | Wang |
| 2011/0026521 A1 | 2/2011 | Gamage et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0261825 A1 | 10/2011 | Ichino |

FOREIGN PATENT DOCUMENTS

| | | |
|---|---|---|
| AU | 2013257420 | 12/2013 |
| CA | 2700866 | 3/2010 |
| CA | 2756289 | 9/2011 |
| EP | 1653688 | 5/2006 |
| EP | 2 193 630 | 6/2010 |
| EP | 2415221 | 10/2010 |
| EP | 2582091 | 4/2013 |
| EP | 2582092 | 4/2013 |
| EP | 2587736 | 5/2013 |
| EP | 2597816 | 5/2013 |
| EP | 14160767.1 | 3/2014 |
| JP | 2002-141905 | 5/2002 |
| JP | 2003-069609 | 3/2003 |
| JP | 2003-124976 | 4/2003 |
| JP | 2003-318949 | 11/2003 |
| WO | WO 95/06989 | 3/1995 |
| WO | WO 2005/106659 | 11/2005 |
| WO | WO 2005/112390 | 11/2005 |
| WO | WO 2008/095010 | 8/2008 |
| WO | WO 2009/042919 | 4/2009 |
| WO | WO 2010/115060 | 10/2010 |

OTHER PUBLICATIONS

Updated portions of prosecution history of U.S. Appl. No. 12/286,098, Nov. 8, 2011, Casado, Martin, et al.
International Preliminary Report on Patentability for PCT/US2008/077950, Sep. 28, 2011, Nicira Networks.
Updated portions of prosecution history of EP08834498, Jun. 9, 2011, Nicira Networks.
Portions of prosecution history of U.S. Appl. No. 12/286,098, Mar. 24, 2011, Casado, Martin, et al.
International Search Report and Written Opinion for PCT/US2008/077950, Jun. 24, 2009 (mailing date), Nicira Networks.
Portions of prosecution history of EP08834498.1, Nov. 29, 2010 (mailing date), Nicira Networks.
International Search Report and Written Opinion for PCT/US2010/029717, Sep. 24, 2010 (mailing date), Nicira Networks.
Author Unknown, "Amazon EC2: Developer Guide (API Version Jun. 26, 2006)," 2006 (Month NA), Amazon.Com, Inc., Seattle, Washington, USA, p. 1.
Author Unknown, "Amazon EC2: Developer Guide (API Version Oct. 1, 2006)," 2006 (Month NA), Amazon.Com, Inc., Seattle, Washington, USA. p. 1.
Author Unknown, "Amazon EC2: Developer Guide (API Version Jan. 19, 2007)," 2006 (Month NA), Amazon.Com, Inc., Seattle, Washington, USA. p. 1.
Author Unknown, "Amazon EC2: Developer Guide (API Version Jan. 3, 2007)," 2007 (Month NA), Amazon.Com, Inc., Seattle, Washington, USA. p. 1.
Author Unknown, "Amazon EC2: Developer Guide, API Version Jan. 3, 2007 (API Version Jan. 3, 2007)," 2007 (Month NA), Amazon.Com, Inc., Seattle, Washington, USA, p. 1.
Author Unknown, "Amazon Elastic Compute Cloud: Developer Guide (API Version Aug. 29, 2007)," 2007 (Month NA), Amazon.Com, Inc., Seattle, Washington, USA. p. 1.
Author Unknown, Cisco VN-Link: Virtualization-Aware Networking, Mar. 2009, Cisco Systems, Inc., p. 1.
Author Unknown, "Introduction to VMware Infrastructure: ESX Server 3.5, ESX Server 3i version 3.5, VirtualCenter 2.5," Dec. 2007, pp. 1-46, Revision: Dec. 13, 2007, VMware, Inc., Palo Alto, California, USA.
Author Unknown, "iSCSI SAN Configuration Guide: ESX Server 3.5, ESX Server 3i version 3.5," VirtualCenter 2.5, Nov. 2007, Revision: Nov. 29, 2007, VMware, Inc., Palo Alto, California, USA. p. 1.
Casado, Martin, et al., "Ethane: Taking Control of the Enterprise," Computer Communication SIGCOMM '07, Aug. 27-31, 2007, Kyoto, Japan, p. 1.
Casado, Martin, et al., "SANE: A Protection Architecture for Enterprise Networks," Proceedings of the 15th USENIX Security Symposium, Jul. 31, 2006, pp. 137-151.
Roch, Stephane, "Nortel's Wireless Mesh Network solution: Pushing the boundaries of traditional WLAN technology," Nortel Technical Journal, Jul. 31, 2005, pp. 18-23, issue 2.
Author Unknown, "Packet Processing on Intel® Architecture," Month Unknown, 2013, 6 pages, available at http://www.intel.com/content/www/us/en/intelligent-systems/intel-technology/packet-processing-is-enhanced-with-software-from-intel-dpdk.html.
Shenker, Scott, et al., "The Future of Networking, and the Past of Protocols," Dec. 2, 2011, 30 pages, USA.

(56) References Cited

OTHER PUBLICATIONS

Updated portions of prosecution history of U.S. Appl. No. 12/286,098, May 7, 2013, Casado, Martin, et al.
Andersen, David, et al., "Resilient Overlay Networks," Oct. 2001, 15 pages, 18th ACM Symp. on Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Author Unknown, "HP OpenView Enterprise Management Starter Solution," Jun. 2006, p. 1-4, Hewlett-Packard Development Company, HP.
Author Unknown, "HP OpenView Operations 8.0 for UNIX Developer's Toolkit," Month Unknown, 2004, pp. 1-4, Hewlett-Packard Development Company, HP.
Author Unknown, "HP Web Jetadmin Integration into HP OpenView Network Node Manager," Feb. 2004, pp. 1-12, HP.
Author Unknown, "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.
Author Unknown, "Intel 82599 10 Gigabit Ethernet Controller: Datasheet, Revision: 2.73," Dec. 2011, 930 pages, Intel Corporation.
Author Unknown, "OpenFlow Switch Specification, Version 0.9.0 (Wire Protocol 0x98)," Jul. 20, 2009, pp. 1-36, Open Networking Foundation.
Author Unknown, OpenFlow Switch Specification, Version 1.0.0 (Wire Protocol Ox01), Dec. 31, 2009, pp. 1-42, Open Networking Foundation.
Author Unknown, "Private Network-Network Interface Specification Version 1.1 (PNNI 1.1)," The ATM Forum Technical Committee, Apr. 2002, 536 pages, The ATM Forum.
Author Unknown, "Single Root I/O Virtualization and Sharing Specification, Revision 1.0," Sep. 11, 2007, pp. 1-84, PCI-SIG.
Author Unknown, "Virtual Machine Device Queues," White Paper, Month Unknown, 2007, pp. 1-4, Intel Corporation.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation, Apr. 2005, pp. 15-28, USENIX Association.
Cai, Zheng, et al., "The Preliminary Design and Implementation of the Maestro Network Control Platform," Oct. 1, 2008, pp. 1-17, NSF.
Congdon, Paul, "Virtual Ethernet Port Aggregator Standards body Discussion," Nov. 10, 2008, pp. 1-26, HP.
Cooper, Brian F., et al., "PNUTS: Yahoo!'s Hosted Data Serving Platform," VLDB'08, Aug. 24-30, 2008, pp. 1-12, ACM, Auckland, New Zealand.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Enns, R., "NETCONF Configuration Protocol," Dec. 2006, pp. 1-96, IETF Trust (RFC 4741).

Farinacci, D., et al., "Generic Routing Encapsulation (GRE)," Mar. 2000, pp. 1-9, The Internet Society (RFC 2784).
Farrel, A., "A Path Computation Element (PCS)—Based Architecture," Aug. 2006, pp. 1-40, RFC 4655.
Fischer, Anna, "[PATCH][RFC] net/bridge: add basic VEPA support," Jun. 2009, pp. 1-5, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Guo, Chanxiong, et al., "BCube: A High Performance, Server-centric Network Architecture for Modular Data Centers," SIGCOMM'09, Aug. 17-21, 2009, 12 pages, ACM, Barcelona, Spain.
Handley, Mark, et al., "Designing Extensible IP Router Software," Proc. of NSDI, May 2005, 14 pages.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, 10 pages, ACM, Athens, Greece.
John, John P., et al., "Consensus Routing: The Internet as a Distributed System," Apr. 2008, 14 pages, Proc. of NSDI.
Katz, D., et. al., "Bidirectional Forwarding Detection, draft-ietf-bfd-base-11.txt," Month Unknown, 2009, pp. 1-51, IETF Trust.
Kim, Changhoon, et al., "Floodless in Seattle: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. on Computer Systems, Aug. 2000, pp. 1-34, vol. 18, No. 3.
Labovitz, Craig, et al., "Delayed Internet Routing Convergence," SIGCOMM '00, Month Unknown, 2000, pp. 175-187, Stockholm, Sweden.
Labovitz, Craig, et al., "Internet Routing Instability," ACM SIGCOMM '97, Month Unknown, 1997, pp. 1-12, Association for Computing Machinery, Inc.
Maltz, David A., et al., "Routing Design in Operational Networks: A Look from the Inside," SIGCOMM'04, Aug. 30-Sep. 3, 2004, 14 pages, ACM, Portland, Oregon, USA.
Mogul, Jeffrey C., et al., "API Design Challenges for Open Router Platforms on Proprietary Hardware," Oct. 2008, 6 pages.
Partridge, Craig, et al., "A 50-Gb/s IP Router," IEEE/ACM Transactions on Networking Jun. 1998, pp. 237-248.
Pelissier, Joe, "Network Interface Virtualization Review," Jan. 2009, pp. 1-38.
Peterson, Larry L., et al., "OS Support for General-Purpose Routers," Month Unknown, 1999, 6 pages.
Pfaff, Ben., et al., "Extending Networking into the Virtualization Layer," Proc. of HotNets, Oct. 2009, pp. 1-6.
Rosen, E., et al., "Applicant Statement for BGP/MPLS IP Virtual Private Networks (VPNs)," The Internet Society, RFC 4365, Feb. 2006, pp. 1-32.
Sherwood, Rob, et al., "Carving Research Slices Out of Your Production Networks with OpenFlow," ACM SIGCOMM Computer Communications Review, Jan. 2010, pp. 129-130, vol. 40, No. 1.
Spalink, Tammo, et al., "Building a Robust Software-Based Router Using Network Processors," Month Unknown, 2001, pp. 216-229, ACM, Banff, CA.
Touch, J., et al., "Transparent Interconnection of Lots of Links (TRILL): Problem and Applicability Statement," May 2009, pp. 1-17, IETF Trust, RFC 5556.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Turner, Jonathan S., "A Proposed Architecture for the GENI Backbone Platform," ANCS'06, Dec. 3-5, 2006, 10 pages, ACM, San Jose, California, USA.
Wang, Yi, et al., "Virtual Routers on the Move: Live Router Migration as a Network-management Primitive," SIGCOMM 08, Aug. 17-22, 2008, 12 pages, ACM, Seattle, Washington, USA.

(56) References Cited

OTHER PUBLICATIONS

Xie, Geoffrey G., et al., "On Static Reachability Analysis of IP Networks," Month Unknown, 2005, pp. 1-14.

Updated portions of prosecution history of U.S. Appl. No. 12/286,098, Jun. 21, 2012, Casado, Martin, et al.

Corrected International Preliminary Report on Patentability for PCT/US2008/077950, Jul. 2, 2012, Nicira Networks.

International Preliminary Report on Patentability for PCT/US2010/029717, Jan. 13, 2012 (completion date), Nicira Networks.

Anwer, Muhammad Bilal, et al., "Building a Fast, Virtualized Data Plane with Programmable Hardware," Aug. 2009, pp. 1-8, VISA'09, Barcelona, Spain.

Author Unknown, "VMware for Linux Networking Support," month unknown, 1999, 5 pages, VMware, Inc.

Casado, Martin, et al., "Rethinking Packet Forwarding Hardware," month unknown, 2008, pp. 1-6.

Casado, Martin, et al., "Scaling Out: Network Virtualization Revisited," month unknown, 2010, pp. 1-8.

Casado, Martin, et al., "Virtualizing the Network Forwarding Plane," month unknown, 2010, pp. 1-6.

Davoli, Renzo, "VDE: Virtual Distributed Ethernet," Feb. 2005, pp. 1-8, TRIDENTCOM'05, IEEE Computer Society.

Godfrey, P. Brighten, et al., "Pathlet Routing," Aug. 2009, pp. 1-6, SIGCOMM.

Greenberg, Albert, et al., "A Clean Slate 4D Approach to Network Control and Management," Oct. 2005, 12 pages, vol. 35, No. 5, ACM SIGCOMM Computer Communication Review.

Gude, Natasha, et al., "NOX: Towards an Operating System for Networks," Jul. 2008, pp. 105-110, vol. 38, No. 3, ACM SIGCOMM Computer communication Review.

Keller, Eric, et al., "The 'Platform as a Service' Model for Networking," month unknown, 2010, pp. 1-6.

Koponen, Teemu, et al., "Onix: A Distributed Control Platform for Large-scale Production Networks," Oct. 2010, 14 pages, in Proc. OSDI.

Lakshminarayanan, Karthik, et al., "Routing as a Service," month unknown, 2004, 16 pages, University of California, Berkeley, Berkeley, California.

Luo, Jianying, et al., "Prototyping Fast, Simple, Secure Switches for Ethane," month unknown, 2007, pp. 1-6.

Pelissier, Joe, "VNTag 101," May 2008, 87 pp.

Pettit, Justin, et al., "Virtual Switching in an Era of Advanced Edges," Sep. 2010, pp. 1-7.

Phan, Doantam, et al., "Visual Analysis of Network Flow Data with Timelines and Event Plots," month unknown, 2007, pp. 1-16, VizSEC.

Sherwood, Rob, et al., "FlowVisor: A Network Virtualization Layer," Oct. 2009, 15 pp., OPENFLOW-TR-2009-1.

Tavakoli, Arsalan, et al., "Applying NOX to the Datacenter," month unknown, 2009, 6 pp., Proceedings of HotNets.

Yang, L., et al., "Forwarding and Control Element Separation (ForCES) Framework," Apr. 2004, pp. 1-41, The Internet Society RFC(3746).

Yu, Minlan, et al., "Scalable Flow-Based Networking with DIFANE," Aug. 2010, pp. 1-16, in Proceedings of SIGCOMM.

Updated portions of prosecution history of commonly owned U.S. Appl. No. 12/286,098, Aug. 14, 2014, Casado, Martin, et al.

Updated portions of prosecution history of AU2010232526, Jun. 13, 2014 (mailing date), Nicira, Inc.

Portions of prosecution history of CA2756289, May 29, 2014 (mailing date), Nicira, Inc.

Portions of prosecution history of EP14160767.1, Aug. 26, 2014 (mailing date), Nicira, Inc.

Wang, Wei-Ming, et al., "Analysis and Implementation of an Open Programmable Router Based on Forwarding and Control Element Separation," Sep. 2008, pp. 769-779, Journal of Computer Science and Technology.

Updated portions of prosecution history of U.S. Appl. No. 12/286,098, Jan. 29, 2014, Casado, Martin, et al.

Portions of prosecution history of AU2008304243, Aug. 1, 2013 (mailing date), Nicira, Inc.

Updated portions of prosecution history of EP08834498.1, Oct. 25, 2013 (mailing date), Nicira, Inc.

Portions of prosecution history of EP12196134.6, Dec. 3, 2013 (mailing date), Nicira, Inc.

Portions of prosecution history of EP12196139.5, Dec. 17, 2013 (mailing date), Nicira, Inc.

Portions of prosecution history of EP12196147.8, Feb. 11, 2014 (mailing date), Nicira, Inc.

Portions of prosecution history of EP12196151.0, Jan. 20, 2014 (mailing date), Nicira, Inc.

Portions of prosecution history of AU2010232526, Oct. 17, 2013 (mailing date), Nicira, Inc.

Portions of prosecution history of EP10716930.2, Apr. 10, 2014 (mailing date), Nicira, Inc.

Das, Suarav, et al., "Unifying Packet and Circuit Switched Networks with OpenFlow," Dec. 7, 2009, 10 pages.

Das, Suarav, et al. "Simple Unified Control for Packet and Circuit Networks," Month Unknown, 2009, pp. 147-148, IEEE.

\* cited by examiner

METHOD AND APPARATUS FOR IMPLEMENTING AND MANAGING DISTRIBUTED VIRTUAL SWITCHES IN SEVERAL HOSTS AND PHYSICAL FORWARDING ELEMENTS

CROSS-REFERENCE TO RELATED APPLICATIONS

The present application claims priority to U.S. Prov. Appln. No. 61/165,875 filed Apr. 1, 2009, the contents of which are incorporated herein by reference in their entirety.

FIELD OF THE INVENTION

The present invention relates to networking, and more particularly to the design and use of virtual switches in virtual networking.

BACKGROUND OF THE INVENTION

The increased sophistication of computing, including mobility, virtualization, dynamic workloads, multi-tenancy, and security needs, require a better paradigm for networking. Virtualization is an important catalyst of the new requirements for networks. With it, multiple VMs can share the same physical server, those VMs can be migrated, and workloads are being built to "scale-out" dynamically as capacity is needed. In order to cope with this new level of dynamics, the concept of a distributed virtual switch has arisen. The idea behind a distributed virtual switch is to provide a logical view of a switch which is decoupled from the underlying hardware and can extend across multiple switches or hypervisors.

One example of a conventional distributed virtual switch is the Nexus 1000V provided by Cisco of San Jose, Calif. Another example is the DVS provided by VMWare of Palo Alto. While both of these are intended for virtual-only environments, there is no architectural reason why the same concepts cannot be extended to physical environments.

Three of the many challenges of large networks (including datacenters and the enterprise) are scalability, mobility, and multi-tenancy and often the approaches taken to address one hamper the other. For instance, one can easily provide network mobility for VMs within an L2 domain, but L2 domains cannot scale to large sizes. And retaining tenant isolation greatly complicates mobility. Conventional distributed virtual switches fall short of addressing these problems in a number of areas. First, they don't provide multi-tenancy, they don't bridge IP subnets, and cannot scale to support tens of thousands of end hosts. Further, the concepts have not effectively moved beyond virtual environments to include physical hosts in a general and flexible manner.

Accordingly, a need remains in the art for a distributed virtual networking platform that addresses these and other issues.

SUMMARY OF THE INVENTION

In general, the present invention relates to a virtual platform in which one or more distributed virtual switches can be created for use in virtual networking. According to some aspects, the distributed virtual switch according to the invention provides the ability for virtual and physical machines to more readily, securely, and efficiently communicate with each other even if they are not located on the same physical host and/or in the same subnet or VLAN. According other aspects, the distributed virtual switches of the invention can support integration with traditional IP networks and support sophisticated IP technologies including NAT functionality, stateful firewalling, and notifying the IP network of workload migration. According to further aspects, the virtual platform of the invention creates one or more distributed virtual switches which may be allocated to a tenant, application, or other entity requiring isolation and/or independent configuration state. According to still further aspects, the virtual platform of the invention manages and/or uses VLAN or tunnels (e.g, GRE) to create a distributed virtual switch for a network while working with existing switches and routers in the network. The present invention finds utility in both enterprise networks, datacenters and other facilities.

In accordance with these and other aspects, a method of managing networking resources in a site comprising a plurality of hosts and physical forwarding elements according to embodiments of the invention includes identifying a first set of virtual machines using a first set of the plurality of hosts and physical forwarding elements, identifying a second set of virtual machines using a second set of the plurality of hosts and physical forwarding elements, certain of the hosts and physical forwarding elements in the first and second sets being the same, and providing first and second distributed virtual switches that exclusively handle communications between the first and second sets of virtual machines, respectively, while maintaining isolation between the first and second sets of virtual machines.

In additional furtherance of these and other aspects, a method of managing communications in a network comprising one or more physical forwarding elements according to embodiments of the invention includes providing a network virtualization layer comprising a logical forwarding element, providing a mapping between a port of the logical forwarding element to a port of certain of the physical forwarding elements, and causing the physical forwarding element to forward a packet using the provided mapping.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, the invention relates to a virtual platform for use with a network that provides the ability for physical and virtual machines associated with it to more readily, securely, and efficiently communicate with each other even if they are not located on the same physical host and/or in the same VLAN or subnet. According to further aspects, it also allows multiple different tenants sharing the same physical network infrastructure to communicate and set configuration state in isolation from each other.

Figure 1:
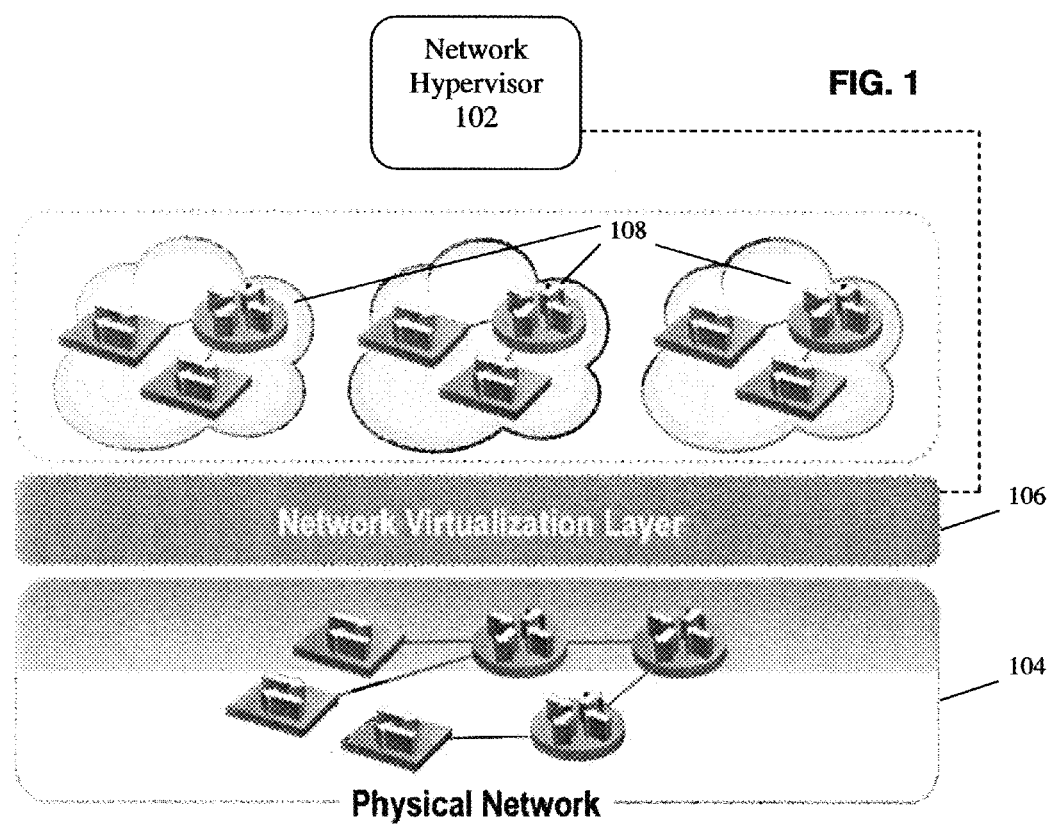
FIG. 1 is a block diagram illustrating aspects of providing a virtual platform according to embodiments of the invention.

An example implementation of aspects of the invention is illustrated in FIG. 1. As shown in FIG. 1, a site such as a data center or an enterprise network can include a physical network 104. The physical network 104 includes a plurality of VMs and/or non-virtualized physical servers, as well as physical and virtual switches. VMs are hosted by a virtualization platform such as that provided by VMWare, (e.g. included in vSphere, vCenter etc.) and physical servers may be any generic computational unit such as those provided by HP, Dell and others. It should be apparent that large hosting services or enterprise networks can maintain multiple data centers, or networks at several sites, which may be geographically dispersed (e.g. San Francisco, New York, etc.).

FIG. 1 further depicts how the invention introduces a network virtualization layer 106 on top of which one or more distributed virtual switches 108 are maintained by a network hypervisor 102. These distributed virtual switches 108 may extend across subnets, may include physical hosts or physical network ports, and can share the same physical hardware. According to aspects of the invention, these distributed virtual switches can provide isolated contexts for multi-tenant environments, can support VM migration across subnets, can scale to tens or hundreds of thousands of physical servers, and can support seamless integration with physical environments.

As a particular example, the invention could be deployed by service providers (such as San Antonio based Rackspace) which often support both virtual and physical hosting of servers for a plurality of customers. In such an example, a single customer may have both VMs and physical servers hosted at the same service provider. Further, a service provider may have multiple datacenters in geographically distinct locations. The invention could be deployed within the service provider operations such that each customer/tenant can be allocated one or more distributed virtual switches (DVS's) 108. These DVS's can be independently configured and given minimum resource guarantees as specified by the service provider operators using hypervisor 102. A single DVS may contain both physical and virtual hosts and may bridge multiple subnets or VLANs. For example, a single DVS 108 may connect to virtual machines at the service provider, physical machines as part of a managed hosting service, and may even extend across the Internet to connect to the customer premises.

According to further aspects, the invention introduces a new abstraction between the physical forwarding elements and control plane. The abstraction exposes the forwarding elements as one or more logical forwarding elements for the control plane. The logical forwarding elements possess similar properties and functionalities as their physical counterparts, i.e., lookup tables, ports, counters, as well as associated capacities (e.g., port speeds and/or bisectional bandwidth).

Although shown separately for ease of illustrating aspects of the invention, the network hypervisor 102 and network virtualization layer 106 are preferably implemented by a common set of software (described in more detail below) that creates and maintains the logical forwarding elements and maps them to the underlying hardware. Nominally, this means exposing forwarding state, counters, and forwarding element events in their corresponding logical context. The control plane, rather than driving the physical forwarding elements directly, then interfaces with the logical forwarding elements.

More particularly, network virtualization layer 106 presents a forwarding abstraction to the control plane which is minimally affected by changes in the physical topology of network 104. From the point of view of the control plane, the addition of switches to the physical topology provides more forwarding bandwidth, but should not require any changes to the control logic, or the existing state in the logical forwarding tables.

Layer 106 allows logical forwarding element ports to be bound to physical ports, or to provide other port abstractions such as virtual machine interfaces, VLANs, or tunnels. It is the job of the network hypervisor 102 (described below) to maintain the mappings between the ports on the logical forwarding elements in layer 106 and the underlying network 104, and to update flow tables in physical and/or virtual switches in the physical network accordingly.

Each logical forwarding element in layer 106 provides an interface compatible with a traditional switch datapath. This is desirable for two reasons. First, the invention is preferably compatible with existing hardware and to be useful, all forwarding should remain on the hardware fast path. Thus, the logical forwarding plane should preferably map to existing forwarding pipelines. Second, existing network control stacks are preferably compatible with the invention. Accordingly, the interface of a logical element in layer 106 includes:

Lookup tables: The logical forwarding element exposes one or more forwarding tables. Typically this includes an L2, L3, and ACL table. One example implementation is designed around OpenFlow (see www.openflow.org), according to which a more generalized table structure is built around a pipeline of TCAMs with forwarding actions specified for each rule. This structure provides quite a bit of flexibility allowing for support of forwarding rules, ACLs, SPAN, and other primitives.

Ports: The logical forwarding element contains ports which represent bindings to the underlying network. Ports may appear and leave dynamically as they are either administratively added, or the component they are bound to fails or leaves. In embodiments of the invention, ports maintain much of the same qualities of their physical analogs including rx/tx counters, MTU, speed, error counters, and carrier signal.

Physical network 104 consists of the physical forwarding elements. In embodiments of the invention, the forwarding elements can be traditional hardware switches with standard forwarding silicon, as well as virtual switches such as those included with hypervisors. In embodiments of the invention, certain or all of the existing switches provide support for a protocol to allow their flow tables to be adjusted to implement the distributed virtual switches of the present invention. Such a protocol can include OpenFlow, but other proprietary and open protocols such as OSPF may be used. In other embodiments of the invention, and according to certain beneficial aspects to be described in more detail below, some or all of the existing physical switches (and perhaps some of the virtual switches) need not support such a protocol and/or have their flow tables adjusted. In such embodiments, tunneling may be used to route traffic through such existing switches.

At a high level, forwarding elements in the physical network 104 that are used by network hypervisor 102 to implement distributed virtual switches 108 have four primary responsibilities: i) to map incoming packets to the correct logical context, ii) to make logical forwarding decisions, iii) map logical forwarding decisions back to the physical next-hop address, and iv) to make physical forwarding decisions in order to send packets to the physical next hop.

Figure 2:
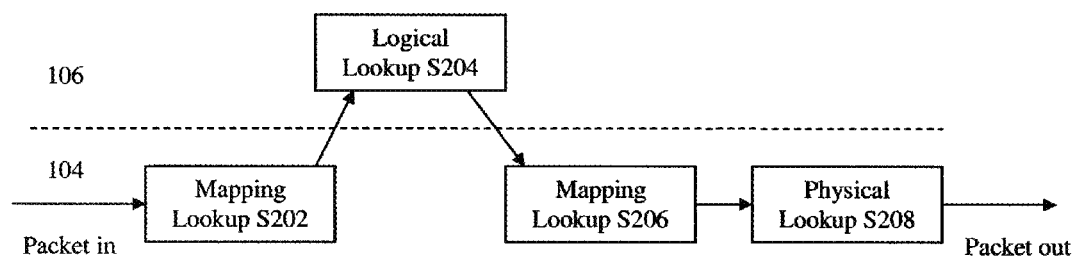
FIG. 2 illustrates a packet forwarding scheme implemented in a network using principles of the invention.

More particularly, as shown in FIG. 2, all packets are handled by exactly one logical forwarding element in layer 106. However, multiple logical forwarding elements may be multiplexed over the same physical switch in physical network 104. So, on ingress, a packet must therefore be mapped to the correct logical context (S202). It may be the case that the current switch does not contain the logical forwarding state for a given packet, in which case it simply performs a physical forwarding decision (i.e., skip to step S208). Also, if all the physical switches are for implementing only a single logical forwarding element, the mapping becomes a no-op because the logical addressing may be used at the physical network.

There are many different field(s) that can be used to map a packet to a logical context by the invention. For example, the field can be an identifying tag such as an MPLS header, or the ingress port. However, in order to provide transparency to end systems, the tag used for identifying logical contexts are preferably not exposed to the systems connecting to the logical switch. In general, this means that the first physical switch receiving a packet tags it to mark the context, and the last switch removes the tag. How the first tag is chosen depends largely on the deployment environment, as will be appreciated by those skilled in the art.

In step S204, once a packet is mapped to its logical context, the physical switch performs a forwarding decision which is only meaningful within the logical context. This could be, for example, an L2 lookup for the logical switch or a sequence of lookups required for a logical L3 router. However, if the physical switch executing the logical decision does not have enough capacity to maintain all the logical state, the logical decision executed may be only a step in overall logical decision that needs be executed; and therefore, packet may require further logical processing before leaving the logical forwarding plane.

In step S206, the logical decision is mapped to physical. The result of a logical forwarding decisions (assuming the packet wasn't dropped) is one or more egress ports on the logical forwarding element in layer 106. Once these are determined, the network must send the packets to the physical objects in network 104 to which these egress ports are bound. This could be, for example, a physical port on another physical switch, or a virtual port of a virtual machine on a different physical server.

Thus, the network hypervisor 102 must provide the physical forwarding element with table entries to map the logical egress port to the physical next hop. In embodiments, the logical and physical networks share distinct (though potentially overlapping) address spaces. Thus, once the physical address is found for the next hop, the (logical) packet must be encapsulated to be transferred to the next hop physical address. Note that it may be that case that a lookup is distributed across multiple physical components in which case the "next hop" will be the next physical component to continue the lookup rather than a logical egress port.

In step S208, physical forwarding finally takes place. The physical forwarding decision is responsible for forwarding the packet out of the correct physical egress port based on the physical address determined by the previous mapping step. This requires a third (or more) lookup over the new physical header (which was created in the previous step).

It is worthwhile to note that if the physical switches of the network do not have multiple logical contexts, but only one, the previous two steps S204 and S206 may become no-ops.

To implement the above four steps, the physical switch needs to have state for: i) lookup to map to logical context, ii) logical forwarding decision, iii) map from logical egress port to physical next hop address, and iv) physical forwarding decision. The hypervisor 102 is responsible for managing the first three, whereas physical forwarding state can be either managed by a standard IGP (such as OSPF or ISIS) implementation or by the hypervisor 102, if it would prefer to maximize the control over the physical network.

In embodiments of the invention, physical network 104 features correspond to the modern line card features. For example, at a minimum, physical and/or virtual switches in network 104 should provide a packet forwarding pipeline to support both multiple logical and physical lookups per a packet. In addition to the basic forwarding actions (such as egress port selection), the hardware should support (nested) en/decapsulation to isolate the logical addressing from the physical addressing if the physical switching infrastructure is shared by multiple logical forwarding planes. Moreover, some or all of physical and/or virtual switches in network 104 must have support for having flow tables adapted by network hypervisor 102, for example using a protocol such as OpenFlow. Other example methods for modifying flow tables include using an SDK such as that provided by networking chipset providers Marvell or Broadcom, or using a switch vendor API such as the OpenJunos API offered by Juniper. It should be noted that in some embodiments, and according to aspects of the invention, existing switches and routers can be used without having their flow tables adjusted by using tunneling.

The capacity of a logical forwarding element may exceed the capacity of an individual physical forwarding element. Therefore, the physical switch/forwarding element should preferably provide a traffic splitting action (e.g., ECMP or hashing) and link aggregation to distribute traffic over multiple physical paths/links. Finally, to effectively monitor links and tunnels the physical switches should provide a hardware based link and tunnel monitoring protocol implementation (such as BPD). Those skilled in the art will recognize how to implement physical switches and other elements in physical network 104 based on these examples, as well as from the overall descriptions herein.

In embodiments, the network hypervisor 102 implementation is decoupled from the physical forwarding elements, so that the hypervisor implementation has a global view over the network state. Therefore, the network hypervisor 102 needs to be involved whenever the state is changed on either side of it, by adjusting mappings and/or flow tables for all affected switches in network 104 accordingly. In other words, when there's a network topology event on the physical network or when the control implementation changes the state of the logical forwarding plane, the network hypervisor 102 needs to be involved. In addition, the hypervisor will execute resource management tasks on a regular intervals on its own to keep the physical network resource usage optimal.

Example mechanisms of hypervisor 102 used to map the abstractions in the logical interface 106 to the physical network 104 according to embodiments of the invention will now be described. For example, assume there is a separate mechanism for creating, defining, and managing what should be in the logical interface—i.e., for example, how many logical forwarding elements the interface should expose and what are their interconnections alike.

If one assumes the used physical switches all provide all the primitives discussed above, the hypervisor 102 has two challenges to meet while mapping the logical interface abstractions to the physical hardware:

Potentially limited switching capacity of individual physical forwarding elements, as well as the limited number and capacity of the ports.

Potentially limited capacity of the TCAM tables of individual physical forwarding elements.

In the context of the data centers, the task of the network hypervisors is simplified since the network topology is likely to be a fat-tree; therefore, multi-pathing, either implemented by offline load-balancing (e.g. ECMP) or online (e.g. TeXCP), will provide unified capacity between any points in the network topology. As a result, the network hypervisor 102 can realize the required capacity even for an extremely high capacity logical switch without having a physical forwarding element with a matching capacity.

Placement problem: If the TCAM table capacity associated with physical forwarding elements is a non-issue (for the particular control plane implementation), the network hypervisor's tasks are simplified because it can have all the logical forwarding state in every physical forwarding element. However, if the available physical TCAM resources are more scarce, the hypervisor 102 has to be more intelligent in the placement of the logical forwarding decisions within the physical network. In a deployment where the physical network elements are not equal (in terms of the TCAM sizes), and some do have enough capacity for the logical forwarding tables, the network hypervisor 102 may use these elements for logical forwarding decisions and then use the rest only to forward packets between them. Those skilled in the art will appreciate that the exact topological location of the high capacity physical forwarding elements can be left to be a deployment specific issue, but either having them in the edge as a first-hop elements or in the core (where they are shared) is a reasonable starting point.

If the deployment has no physical forwarding elements capable of holding the complete logical forwarding table(s), the hypervisor 102 can partition the problem either by splitting the problematic logical lookup step to span multiple physical elements or using separate physical forwarding elements to implement separate logical lookup steps (if the logical forwarding is a chain of steps). In either case, the physical forwarding element should send the processed packets to the next physical forwarding element in a way that conveys the necessary context for the next to continue the processing where the previous physical forwarding stopped.

If the deployment specific limitations are somewhere between the above two extremes, the network hypervisor 102 can explicitly do trade-offs between the optimal forwarding table resource usage and optimal physical network bandwidth usage.

Finally, note that as with all the physical forwarding elements, if the forwarding capacity of an individual element with the required capacity for the logical forwarding table(s) becomes a limiting factor, the hypervisor 102 may exploit load-balancing over multiple such elements circumvent this limit.

Figure 3:
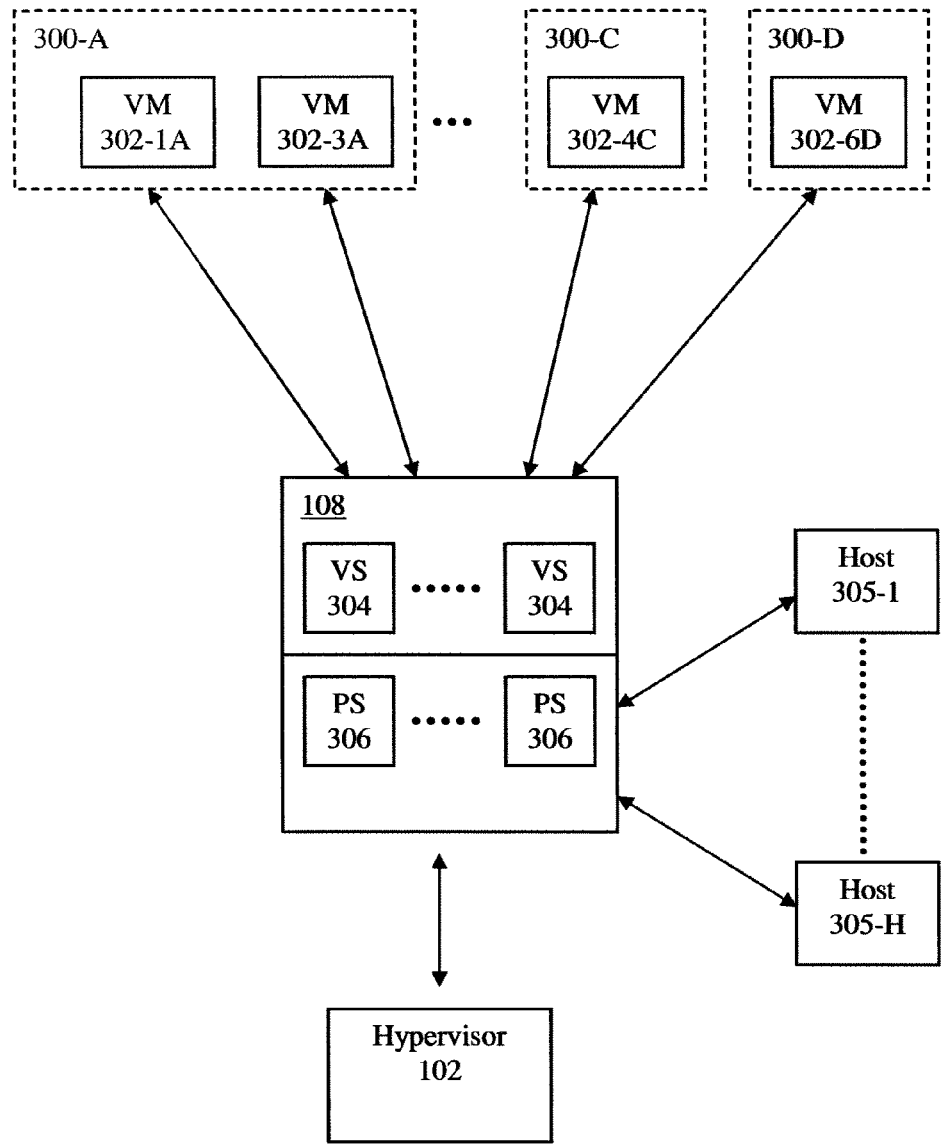
FIG. 3 illustrates an example of providing a distributed virtual switch in accordance with the invention in a data center having several virtual machines and physical hosts.

In one particular example implementation shown in FIG. 3, the invention provides a distributed virtual network platform that distributes across multiple virtual and physical switches, and that combines both speed, security and flexibility in a novel manner. As shown in FIG. 3, the invention provides a distributed virtual switch (DVS) 108 that allows VMs to communicate across hosts and/or virtual LANs and/or subnets in an efficient manner similar to being within the same L2 network. Further, the invention allows multiple distributed virtual switches 108 to be instantiated on the same physical host or within the same data-center allowing multiple tenants to share the same physical hardware while remaining isolated both from addressing each other and consuming each others' resources.

As shown in FIG. 3, an organization (e.g. data center tenant) has a plurality of physical hosts and VMs using services of the data center having hosts 300-A to 300-X. As shown, these include at least VMs 302-1 and 302-3 on host 300-A, VM 302-4 on host 300-C and VM 302-6 on host 300-D. Although a data center can attempt to include these VMs in a common VLAN for management and other purposes, this does not become possible when the number of VMs exceeds the VLAN size supported by the data center. Further, VLANs require configuration of the network as VMs move, and VLANs cannot extend across a subnet without an additional mechanism.

As further shown in FIG. 3, virtual switches 304—possibly also distributed on a plurality of different hosts 300—and physical switches 306 are used by the virtualization layer 106 of the invention and/or hypervisor 102 to collectively act as a single distributed virtual switch 308 to collectively allow these diverse VMs to communicate with each other, and further also with authorized hosts 305 (e.g. authorized users of a tenant organization which may be on a separate external customer premises, and/or connected to the resources of the data center via a public or private network), even if they are located on different hosts and/or VLANs (i.e. subnets). As mentioned above, and will be discussed in more detail below, hypervisor 102 can be used to manage the virtual network, for example by configuring QOS settings, ACLs, firewalls, load balancing, etc.

In embodiments, hypervisor 102 can be implemented by a controller using a network operating system such as that described in co-pending U.S. patent application Ser. No. 12/286,098, now published as U.S. Patent Publication 2009/0138577, the contents of which are incorporated by reference herein, as adapted with the principles of the invention. However, other OpenFlow standard or other proprietary or open controllers may be used. Hypervisor 102 and/or distributed virtual switch 108 can also leverage certain techniques described in U.S. patent application Ser. No. 11/970,976, published as U.S. Patent Publication 2008/0189769, and now abandoned, the entire contents of which are also incorporated herein by reference.

Virtual switches 304 can include commercially available virtual switches such as those provided by Cisco and VMware, or other proprietary virtual switches. Preferably, most or all of the virtual switches 304 include OpenFlow or other standard or proprietary protocol support for communicating with network hypervisor 102. Physical switches 306 can include any commercially available (e.g. NEC (IP8800) or HP (ProCurve 5406ZL)) or proprietary switch that includes OpenFlow or other standard or proprietary protocol support such as those mentioned above for communicating with network hypervisor 102. However, in embodiments of the invention mentioned above, and described further below, some or all of the existing physical switches and routers 306 in the network are used without having flow tables affected by using tunneling.

As shown in FIG. 3, virtual switches 304 communicate with virtual machines 302, while physical switches 306 communicate with physical hosts 305.

An example host 300 includes a server (e.g. Dell, HP, etc.) running a VMware ESX hypervisor, for example. However, the invention is not limited to this example embodiment, and those skilled in the art will understand how to implement this and equivalent embodiments of the invention using other operating systems and/or hypervisors, etc. These include, for example, Citrix XenServer, Linux KVM Moreover, it should be noted that not all of the physical hosts included in an organization managed by hypervisor 102 need to run any virtualization software (e.g. some or all of hosts 305).

An example implementation of a distributed virtual switch 108 according to an embodiment of the invention will now be described in connection with FIG. 4. As set forth above, a distributed virtual switch 108 such as that shown in FIG. 4 harnesses multiple traditional virtual switches 304 and physical switches 306 to provide a logical abstraction that is decoupled from the underlying configuration.

Figure 4:
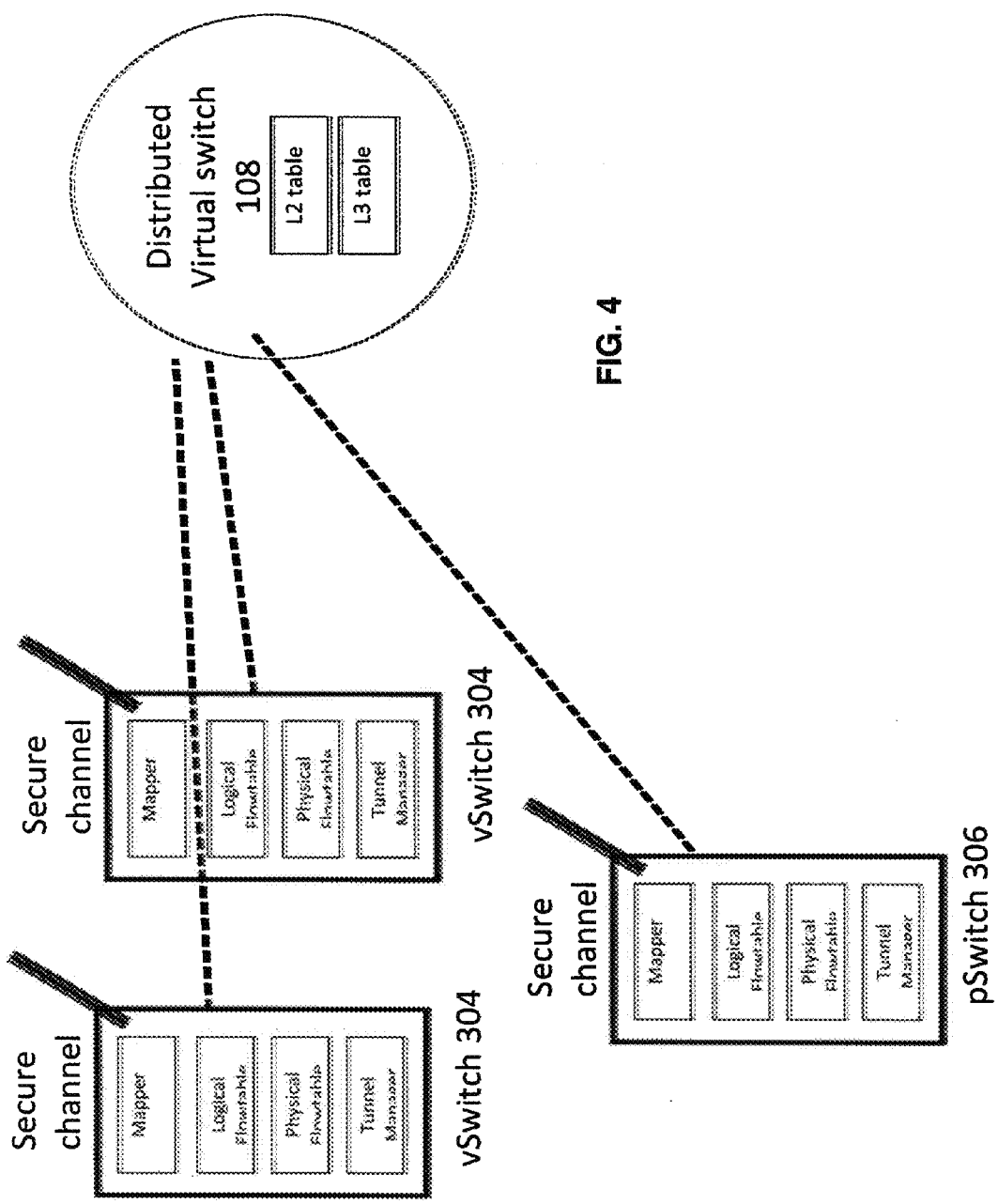
FIG. 4 is a functional block diagram of an example distributed virtual switch according to embodiments of the invention.

It can be seen in FIG. 4, and should be noted, that distributed virtual switch 108 preferably includes its own L2 and L3 logical flow tables, which may or may not be the same as the flowtables in the underlying switches 304 and 306. This is to implement the logical forwarding elements in the control plane of the virtualization layer 106 as described above.

As shown in FIG. 4, each virtual and physical switch used by distributed virtual switch 108 includes a secure channel for communicating with network hypervisor 102. This can be, for example, a communication module that implements the OpenFlow standard (See www.openflow.org) and is adapted to communicate with a controller using the OpenFlow protocol. However, other proprietary and open protocols are possible.

Each virtual and physical switch 304 and 306 also includes its own logical and physical flowtables, as well as a mapper to map an incoming packet to a logical context (i.e. such that a single physical switch may support multiple logical switches). These can be implemented using the standard flowtables and forwarding engines available in conventional switches, as manipulated by the hypervisor 102. In other words, hypervisor 102 adjusts entries in the existing flowtables so that the existing forwarding engines in 304 and 306 implement the logical and other mappings described above. It should be appreciated that switches 304 and 306 can have additional flow table entries that are not affected by the present invention, and which can be created and maintained using conventional means (e.g. network administration, policies, routing requirements, etc.).

As further shown in FIG. 4, in order to support communications across different subnets, and also to adapt to existing physical and/or virtual switches and routers that are not affected by having adjusted flow tables, the certain physical and virtual switches 306 and 304 used in the invention to implement a distributed virtual switch 108 preferably include a tunnel manager. In one example embodiment, tunnel manager uses VLANs or Generic Route Encapsulation (GRE) tunnels to a set of virtual private networks (PVNs), which function as virtual private L2 broadcast domains. Controller 110 maintains a database that maps VMs 102 to one or more associated PVNs. For each PVN controller 110 and/or switch 104 create and maintain a set of PVN tunnels connecting the hosts along which broadcast and other packets are carried. In this way, VMs 102 in the same PVN can communicate with each other, even if they are in different L2 domains and/or different hosts. Moreover, all the VMs associated with hosts in a PVN see all broadcast packets sent by VMs on other hosts within the PVN, and these packets are not seen by any hosts outside of that PVN.

There are many different ways that tunnels can be created and/or how hosts can be interconnected via PVNs using tunnel manager 204 in accordance with the invention, as will be appreciated by those skilled in the art.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. For a network hypervisor, a method of managing a network comprising physical forwarding elements, the method comprising:
    identifying a set of virtual machines communicatively coupled to a set of physical forwarding elements, at least one of the physical forwarding elements in the set of physical forwarding elements also coupled to a virtual machine that is not in the set of virtual machines;
    generating a set of flow entries for the set of physical forwarding elements to use to implement a logical forwarding element that is to handle communications between the set of virtual machines, wherein the logical forwarding element maintains isolation between the set of virtual machines and other virtual machines that are coupled to the set of physical forwarding elements but are not in the set of virtual machines; and
    sending the generated set of flow entries to the set of physical forwarding elements, wherein a particular physical forwarding element in the set of forwarding elements is for using the set of flow entries to (i) make a set of logical forwarding decisions to identify a logical egress port of the logical forwarding element for a packet received from a virtual machine in the set of virtual machines and (ii) map the identified logical egress port to a physical port of the particular forwarding element through which to send the packet.

2. The method of claim 1, wherein the physical forwarding elements comprise one or more virtual switches.

3. The method of claim 1, wherein the physical forwarding elements comprise one or more physical switches.

4. The method of claim 1, wherein said other virtual machines that are not in the set of virtual machines communicate with each other via another logical forwarding element that is implemented by the set of physical forwarding elements.

5. The method of claim 1, wherein the set of virtual machines are associated with a particular data center tenant, wherein said other virtual machines that are not in the set of virtual machines are associated with another data center tenant.

6. The method of claim 1, wherein said sending the generated set of flow entries comprises:
   sending a set of flow entries to a logical flow table of the particular physical forwarding element that specifies logical forwarding decisions that would be made by the particular physical forwarding element to implement the distributed virtual switch;
   sending a set of flow entries to a physical flow table of the particular physical forwarding element that specifies physical forwarding decisions that would be made by the particular physical forwarding element; and
   determining a mapping between the logical flow table and the physical flow table, wherein the particular physical forwarding element forwards packets using the logical flow table and the physical flow table and the determined mapping.

7. The method of claim 1, wherein the particular physical forwarding element is a first physical forwarding element, wherein mapping the identified logical egress port to the physical port of the first physical forwarding element comprises:
   mapping the identified logical egress port to a physical port of a second physical forwarding element of the set of physical forwarding elements; and
   making a set of physical forwarding decisions to identify the physical port of the first physical forwarding element through which to send the packet toward the second physical forwarding element.

8. The method of claim 1, wherein the logical forwarding element maintains at least one of counters, port speeds and bisectional bandwidth for logical ports of the logical forwarding element.

9. The method of claim 1, wherein at least two virtual machines of the set of virtual machines are in different subnets.

10. The method of claim 1, further comprising providing tunnels through at least two of the physical forwarding elements.

11. The method of claim 10, wherein the tunnels comprise GRE tunnels.

12. A networking site comprising a plurality of physical forwarding elements, the networking site comprising:
   a set of hosts for hosting a set of virtual machines communicatively coupled to a set of physical forwarding elements, at least one of the physical forwarding elements in the set of physical forwarding elements also coupled to a virtual machine that is not in the set of virtual machines; and
   a network hypervisor for generating a set of flow entries for the set of physical forwarding elements to use to implement a distributed virtual switch to handle communications between the virtual machines of the set of virtual machines and sending the generated set of flow entries to the set of physical forwarding elements, wherein the distributed virtual switch maintains isolation between the set of virtual machines and other virtual machines that are coupled to the set of physical forwarding elements but are not in the set of virtual machines, wherein a particular physical forwarding element in the set of forwarding elements is for using the set of flow entries to (i) make a set of logical forwarding decisions to identify a logical egress port of the distributed virtual switch for a packet received from a virtual machine in the set of virtual machines and (ii) map the identified logical egress port to a physical port of the particular forwarding element through which to send the packet.

13. The networking site of claim 12, wherein the physical forwarding elements comprise one or more virtual switches.

14. The networking site of claim 12, wherein the physical forwarding elements comprise one or more physical switches.

15. The networking site of claim 12, wherein the distributed virtual switch further handles communications between external hosts and the set of virtual machines.

16. The networking site of claim 12, wherein the particular physical forwarding element comprises a machine readable medium for storing:
   a logical flow table that specifies the logical forwarding decisions to identify logical egress ports of the distributed virtual switch; and
   a set of mappings between the logical egress ports and the physical ports of the particular physical forwarding element.

17. The networking site of claim 12, wherein the distributed virtual switch maintains at least one of counters, port speeds, and bisectional bandwidth for logical ports of the distributed virtual switch.

18. The networking site of claim 12, wherein at least two virtual machines of the first set of virtual machines are in different subnets.

19. The networking site of claim 12, wherein tunnels are set up through at least two of the physical forwarding elements.

20. The networking site of claim 19, wherein the tunnels comprise GRE tunnels.

21. The networking site of claim 12, wherein the distributed virtual switch is created by modifying a set of flow tables of the set of physical forwarding elements.

22. The networking site of claim 21, wherein the set of flow tables comprises at least one of a logical L2 table, a logical L3 table, and a logical ACL table.

23. The networking site of claim 12,
   wherein identifying the physical port of the particular physical forwarding element comprises:
      identifying a physical port of another physical forwarding element in the set of physical forwarding elements to which the logical egress port is mapped; and
      sending the packet out of the particular physical forwarding element based on the identified physical port of the other physical forwarding element.

24. For a multi-tenant hosting system that uses a plurality of hosts and a plurality of physical forwarding elements to provide different sets of hosted virtual machines for different tenants, a method comprising:
   defining a set flow entries for a set of physical forwarding elements to use to implement a distributed virtual switch for one particular tenant, the distributed virtual switch to handle communications between the virtual machines of the particular tenant while isolating the particular tenant's virtual machines from the virtual machines of other tenants; and
   sending the set of flow entries to the set of forwarding elements, the set of flow entries for populating a set of flow tables of a particular physical forwarding element in the set of physical forwarding elements, wherein the particular physical forwarding element is for making a plurality of lookups on the set of flow tables in order to (i) identify a distributed virtual switch for a particular tenant for a packet from a first virtual machine of the particular tenant to a second virtual machine of the particular tenant, (ii) identify a logical egress port of the distributed virtual switch for the packet, and (iii) identify a physical port of the particular physical forwarding element through which to send the packet out of the particular physical forwarding element based on the identified logical egress port.

25. The method of claim 24, wherein a physical forwarding element comprises a physical switch.

26. The method of claim 24, wherein a physical forwarding element comprises a virtual switch.

27. The method of claim 24, wherein the first virtual machine is in a first virtual local area network (VLAN) and the second virtual machine is in a second VLAN.

28. The method of claim 24, wherein the particular physical forwarding element uses the lookups to add a logical context to the packet, the logical context for identifying a distributed virtual switch for a particular tenant.

\* \* \* \* \*